Figure 1:
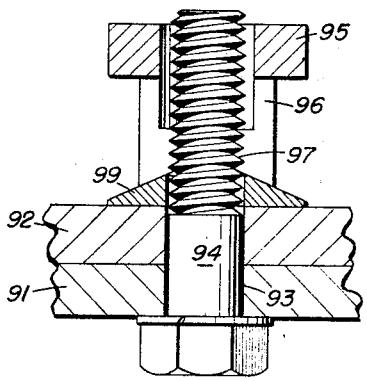

Oct. 25, 1966  N. N. RUBIN  3,280,690

TORQUE LIMITING NUT

Original Filed Feb. 28, 1964

INVENTOR

Norman N. Rubin

BY Claude Funkhouser

ATTORNEY

# 3,280,690
TORQUE LIMITING NUT
Norman N. Rubin, 10012 Portland Place,
Silver Spring, Md.
Original application Feb. 28, 1964, Ser. No. 348,917.
Divided and this application Sept. 20, 1965, Ser. No.
488,825
1 Claim. (Cl. 85—61)

The invention described herein may be manufactured and used by or for the Government of the United States of America for governmental purposes without the payment of any royalties thereon or therefor.

This invention which is a division of Ser. No. 348,917, filed Feb. 28, 1964, relates to separable fasteners of the bolt and nut type, and more particularly to a nut designed to have relative linear motion, with a bolt, effected by rotary motion ineffective to produce relative linear motion, upon a predetermined resistance to torque being established.

There are instances where a nut and bolt are used where overtightening of the nut is detrimental to the job to which the separable fastener is applied. An extra turn can weaken the threads and sometimes the entire strain of the fastening is on a single thread which when subjected to an overstrain can rupture and render the fastener useless. There are instances where, due to the nature of the material, such as glass or ceramic material of a fragile nature, the nut should not be tightened after a predetermined resistance is reached. Any further torque will rupture the material and any lesser torque will not insure a complete fastening. While it is true there are wrenches where the torque is measured, any force beyond this measurement results in a not-turning of the nut. However, it is believed that this does not solve the problem as it is notorious that although tools are made to do a particular job, the mechanic will use the tool at hand and the advantages of designing a tool for a particular purpose is wasted. With the design of a nut which could not be tightened beyond a desired resistance to turning the hazard of overtightening could be avoided.

It is an object of the present invention to provide a separable fastener of the nut and bolt type which has relative linear movement between the nut and the bolt upon the application of rotary motion to the nut, which upon a predetermined resistance to turning being reached, further torque applied to the nut will be ineffective to produce further relative linear motion between the nut and bolt.

It is another object of the present invention to provide a separable fastener such as a nut and bolt where the nut is designed so that it may not be overtightened, and that upon a predetermined resistance to turning being reached, any further torque applied will be ineffective to produce any linear movement of the nut relative to the bolt.

It is another object of the present invention to provide a structure which is built into the fastener itself which prevents overtightening.

It is another object of the present invention to provide friction drive means within the body structure of the nut which upon reaching a predetermined load will slip permitting continued turning of the nut without advancement of the nut on the bolt.

It is a further object of the present invention to provide a nut having two separable portions, one of the portions engaging the threads of the bolt and the other of said portions being engaged by a wrench and turning the first portion through some disengageable drive.

It is a further object of the present invention to provide means within the body structure of the nut to permit rotation of the nut without linear movement of the nut relative to the bolt.

It is a further object of the present invention to provide a nut formed with an elongated body made of separated longitudinal segments and to thread a portion of the interior of these segments and to engage the nut with means to spread the segments to prevent cooperation of the threads of the bolt with those of the nut.

It is a further object of the present invention to provide a separable fastener having a bolt and a nut with the nut being of two parts, one of the parts engaging the threads of the bolt and the other of said parts being used to turn the bolt engaging nut with a disengaging drive means between the two sections of the nut so that when a predetermined resistance to turning is reached one of the sections of the nut may be rotated without imparting rotation to the other section.

A further object of the present invention is to provide a cylindrical nut divided into resilient segments by longitudinal slits and to form the nut with a conical shaped base, which will upon contact with a conical washer spread the segments of the nut to disengage the threads of the nut and bolt.

It is a further object of the present invention to provide a washer for cooperation with the base of a split nut, the slope of the washer determining the separation of the segments of the nut, and so determining the relative displacement between the bolt and the nut.

Figure 2:
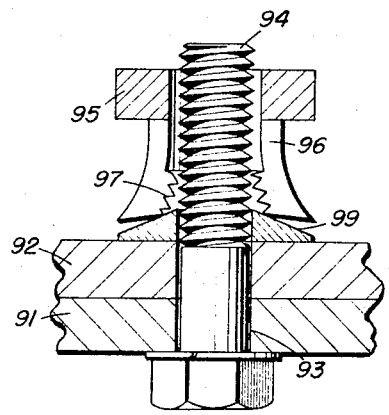
Figure 3:
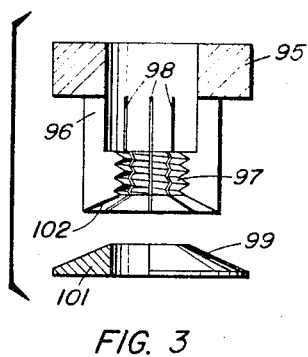
Figure 4:
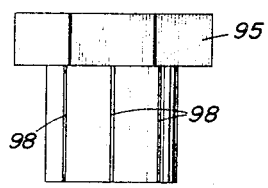
Figure 6:
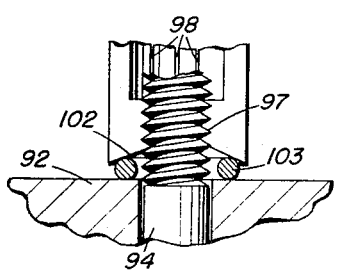
Figure 5:
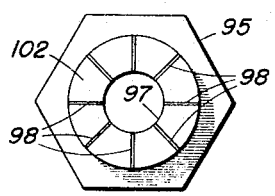

Other objects, advantages and novel features of the invention will become apparent from the following detailed description of the invention when considered in conjunction with the accompanying drawings wherein:

FIG. 1 is a vertical cross-sectional view;
FIG. 2 is a view similar to that of FIG. 1 showing the parts in different position;
FIG. 3 is an exploded view of the nut and washer, in section, of FIG. 1;
FIG. 4 is a front elevation of the nut of the fastener shown in FIG. 1;
FIG. 5 is a bottom plan view of the nut of FIG. 4;
FIG. 6 is a partial vertical cross-sectional view of a modified form of the fastener of FIG. 1.

Any two pieces 91 and 92 drilled as at 93 to receive a bolt 94 may be of a type which cannot stand up under high pressure such as an ordinary nut and bolt may exert. The bolt 94 is an ordinary bolt having a hexagon head and a threaded body. The nut is formed with a hexagon head 95 and a cylindrical resilient body portion 96 which is interiorly threaded for a portion of its length at at 97, the remainder of the interior of the body portion being free of the threads of the bolt.

The body portion of the nut is formed with a plurality of slits 98 extending from the head to the end of the body portion and separating the body into resilient cylindrical segments. The inward end of the body portion is of frusto-conical shape and engages the upper surface 99 of a washer 101. The washer 101 is a frusto-conical washer, the slope of which is predetermined to provide the factor determining the amount of torque which will permit turning of the nut without any advancement of the nut on the bolt.

Referring to FIG. 6 the frusto-conical washer may be replaced with any washer or ring which will serve the purpose such as the ring 103. With the use of the ring type washer, the resistance could be varied by using rings having a cross-section of different diameters.

In operation the nut is turned until the friction between the face of the washer and the bottom surface of the body portion of the nut is overcome. The cylindrical segments of the body portion will then spread relieving the threads of the nut from engagement with the threads of the bolt and the nut will ride on the conical portion of the washers and jump a thread under the tendency of the segments to return to normal position and reengage with the threads of the bolt without advancing the nut on the bolt. It will be easily apparent that the nut may be continually rotated without any relative linear movement between the nut and bolt.

Obviously many modifications and variations of the present invention are possible in the light of the above teachings. It is therefore to be understood that within the scope of the appended claim the invention may be practiced otherwise than as specifically described.

What is claimed is:

A separable fastener comprising:

- a bolt formed with a head and an externally threaded shank;
- a one piece nut having an enlarged wrenching portion at one end thereof and an elongated cylindrical body portion extending from said wrenching portion, said body portion being formed with a plurality of slits extending from its free end throughout substantially the entire length thereof and dividing the elongated body portion into a plurality of resilient segments integrally connected to said wrenching portion, said segments being arcuate in cross section and being interiorly threaded over a portion of their length to engage the threads of the bolt;
- the free ends of said elongated cylindrical body portion being recessed to provide a frusto-conical interior surface;
- a solid washer having a frusto-conical surface corresponding substantially to that of the recess, said surface engaging said recess to radially spread the segments and free the threaded portion from the threads of the bolt;
- the release of said threaded portion from the threads of the bolt causing a linear movement of the nut relative to the threads and a resumption of the original positions of the segments of the nut body to re-engage the threads of the bolt.

References Cited by the Examiner

UNITED STATES PATENTS

| | | | |
|---|---|---|---|
| 985,826 | 3/1911 | McLaughlin | 151—19 |
| 1,573,426 | 2/1926 | Stock et al. | 151—19 |
| 1,705,811 | 3/1929 | Eidel | 85—50 |
| 2,524,481 | 10/1950 | Schermuly et al. | 85—33 |

CARL W. TOMLIN, *Primary Examiner.*

R. S. BRITTS, *Assistant Examiner.*